(12) United States Patent
Neff

(10) Patent No.: US 7,097,566 B2
(45) Date of Patent: Aug. 29, 2006

(54) TEMPORARY REPAIR DEVICE FOR MECHANICAL DRIVE COUPLINGS

(76) Inventor: Philip E. Neff, 1375 Old Plank Rd., Milford, MI (US) 48381

( * ) Notice: Subject to any disclaimer, the term of this patent is extended or adjusted under 35 U.S.C. 154(b) by 0 days.

(21) Appl. No.: 11/120,868

(22) Filed: May 3, 2005

(65) Prior Publication Data
US 2005/0197193 A1 Sep. 8, 2005

Related U.S. Application Data

(62) Division of application No. 10/662,144, filed on Sep. 12, 2003, now abandoned.

(51) Int. Cl.
*F16D 3/18* (2006.01)
(52) U.S. Cl. .......................... 464/120; 403/11; 464/158

(58) Field of Classification Search ................ 464/106, 464/162, 157–159, 112, 120; 403/11, 13, 403/142, 354, 359, 377, 359.5; 24/710.7
See application file for complete search history.

(56) References Cited

U.S. PATENT DOCUMENTS 2,319,319 A * 5/1943 Graham ...................... 464/120
4,943,182 A * 7/1990 Hoblingre ............ 403/359.5 X

* cited by examiner

*Primary Examiner*—Greg Binda
(74) *Attorney, Agent, or Firm*—Harness, Dickey & Pierce, PLC

(57) ABSTRACT

A repair device for a flexible drive coupling having a shell and a hub includes a first member fixed to the shell and a second member fixed to the hub. The first member includes a slot. A portion of the second member extends from the hub and is slidably positioned within the slot. The first and second members are drivingly engageable with one another to transfer torque between the shell and the hub.

13 Claims, 5 Drawing Sheets

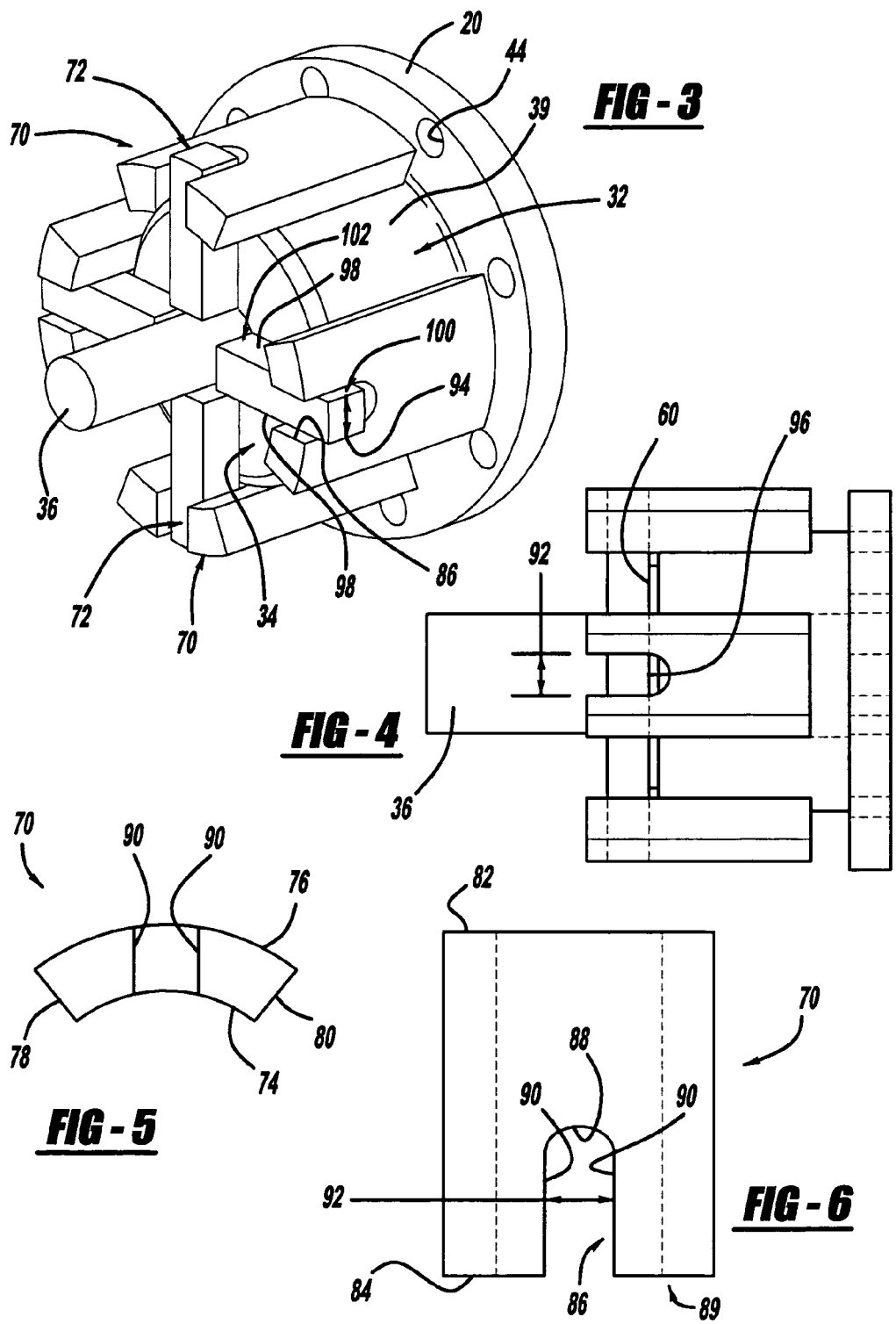

TEMPORARY REPAIR DEVICE FOR MECHANICAL DRIVE COUPLINGS

CROSS-REFERENCE TO RELATED APPLICATIONS

This application is a divisional of U.S. patent application Ser. No. 10/662,144 filed on Sep. 12, 2003, now abandoned. The disclosure of the above application is incorporated herein by reference.

BACKGROUND AND SUMMARY OF THE INVENTION

The present invention relates to mechanical drive couplings and, more particularly, to a temporary repair device for mechanical drive couplings.

Mechanical drive couplings are often used to provide a driving connection between power supplies such as a motor and mechanisms to be driven, such as a pump, a gear reduction unit or the like. Based on the difficulty of exactly aligning the components of such systems, flexible drive couplings are used to accommodate reasonable degrees of non-alignment between the shaft members of the power source and the driven component.

One type of flexible drive coupling includes a rigid half and a flexible half. The flexible half is fixed to either the driving or driven shaft and rotates about the centerline of the shaft to which it is connected. The flexible half is a two-part assembly including a coupling shell and a coupling hub. The coupling shell is fixed to the rigid half. The coupling hub includes external gear elements which mesh with internal gear elements of the coupling shell. The coupling hub may move within the coupling shell to accommodate for misalignment between the driving and driven shafts while maintaining a rotary power interconnection between the rigid half and the flexible half.

While these gear type flexible drive couplings have performed sufficiently in the past, concerns arise. Specifically, the gear interface between the coupling hub and the coupling shell sometimes fails. The failure is usually due to friction created from excessive misalignment, lack of lubrication or both. When the coupling fails, the gear segments of the hub slide past the gear segments of the shell. As such, torque is not transmitted through the flexible drive coupling. Once the coupling no longer transmits torque, the alternatives available include replacing the coupling or making a temporary repair to the existing coupling. Unfortunately, a new coupling is often not available due to the variety of coupling types and sizes used. Furthermore, the cost of maintaining a complete selection of service stock is prohibitive. Therefore, it would be advantageous to repair the existing coupling in order to be able to minimize down time and use the machinery while waiting for a replacement coupling to arrive.

Several repair methods have been attempted. One method includes welding the shell to the hub. This repair eliminates any flexibility in the joint and usually fails within a very short period of time. Another repair method includes burning a hole through the shell and welding a post to both the hub and the shell. This repair typically does not perform well and suffers repeated breakdowns.

Accordingly, it is an object of the present invention to provide a temporary repair device for a flexible drive coupling which is durable and capable of maintaining relative movement between the coupling hub and the coupling shell.

It is a further object of the present invention to provide a temporary repair device for a flexible drive coupling that may be installed on a failed drive coupling without disassembling the components which are drivingly interconnected.

It is another object of the present invention to provide a repair device for a flexible drive coupling which is economical to stock or manufacture and easy to install.

Therefore, the present invention includes a temporary repair device for a flexible drive coupling having a shell and a hub. The repair device includes a first member fixed to the shell and a second member fixed to the hub. The first member includes a slot. A portion of the second member extends from the hub and is slidably positioned within the slot. The first and second members are drivingly engageable with one another to transfer torque between the shell and the hub while allowing the hub and shell to move relative to one another while rotating about axes which are not coaxially aligned.

BRIEF DESCRIPTION OF THE DRAWINGS

The present invention will become more fully understood from the detailed description and the accompanying drawings, wherein:

FIG. 3 is a perspective view of an alternate embodiment temporary repair device;

FIG. 4 is a side view of the alternate embodiment temporary repair device of FIG. 3 coupled to an exemplary flexible drive coupling;

FIG. 5 is a top view of a first member of the temporary repair device;

FIG. 6 is a plan view of the first member of the temporary repair device;

DETAILED DESCRIPTION OF THE PREFERRED EMBODIMENTS

The following description of the preferred embodiment is merely exemplary in nature and is in no way intended to limit the invention, its application, or uses.

Figure 1:
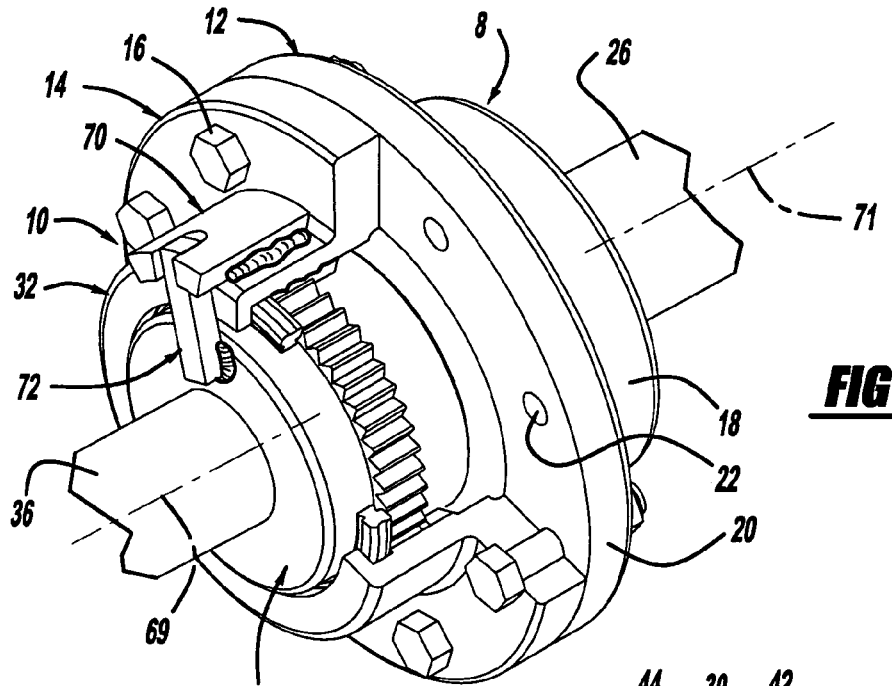
FIG. 1 is a fragmentary perspective view of an exemplary flexible drive coupling equipped with a temporary repair device constructed in accordance with the teachings of the present invention.
Figure 2:
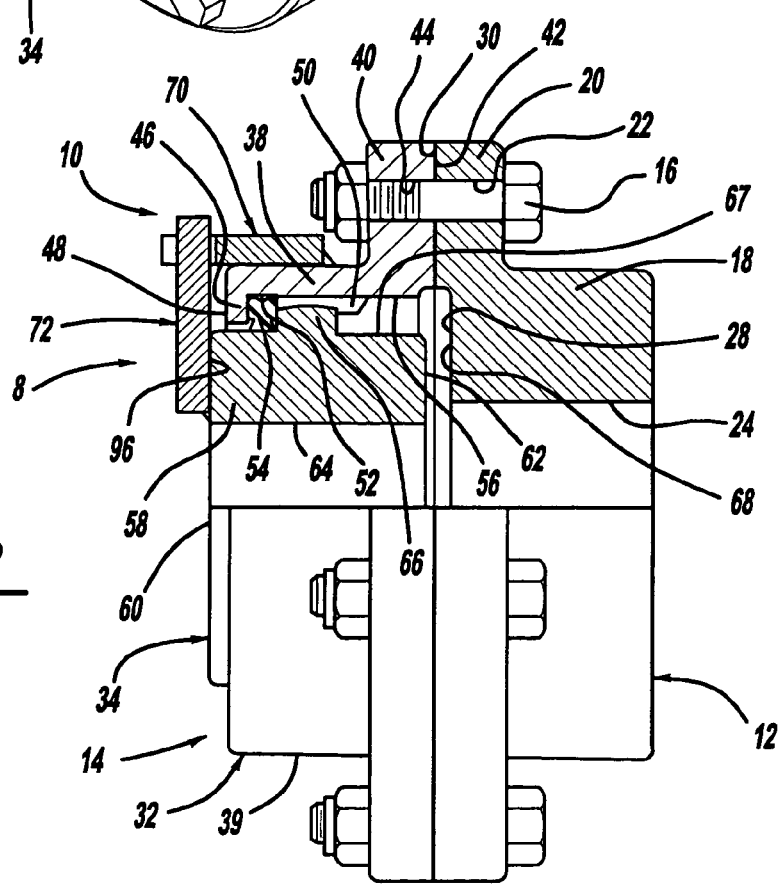
FIG. 2 is a partial cross-sectional side view of the flexible drive coupling and temporary repair device of the FIG. 1.
Figure 7:
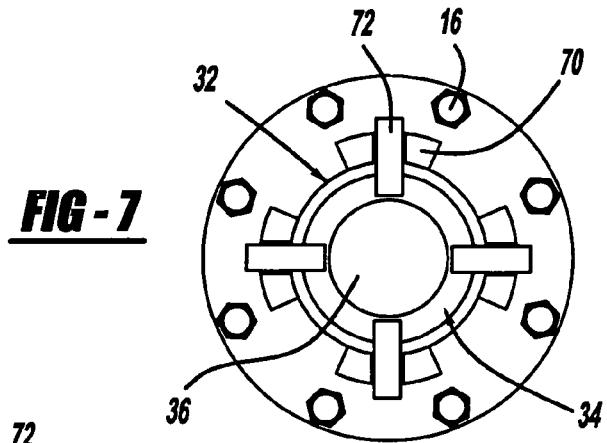
FIG. 7 is an end view of an alternate embodiment temporary repair device coupled to a flexible drive coupling of a predetermined size.
Figure 8:
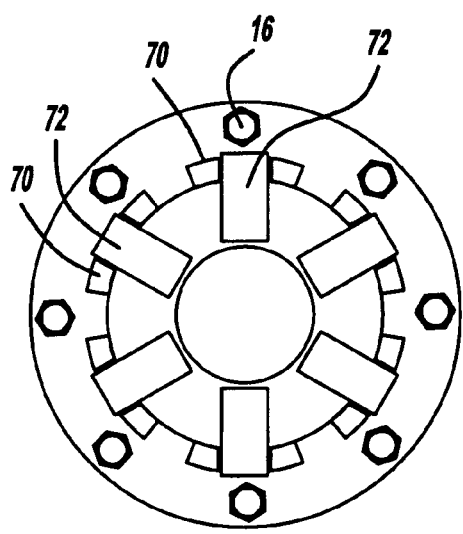
FIG. 8 is an end view of an alternate embodiment temporary repair device coupled to an exemplary flexible drive coupling having a size greater than the drive coupling of FIG. 7.
Figure 9:
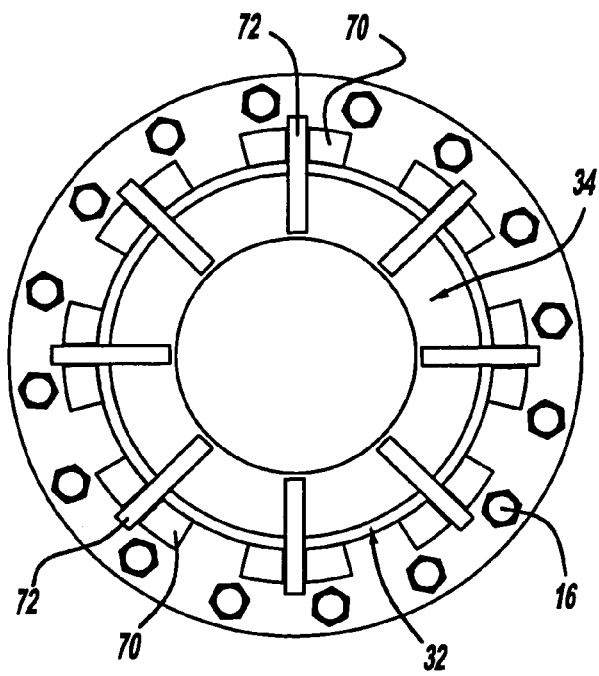
FIG. 9 is an end view of another alternate embodiment temporary repair device shown coupled to a flexible drive coupling having a size greater than the drive couplings shown in FIGS. 7 and 8.

FIGS. 1 and 2 depict an exemplary flexible drive coupling 8 having a temporary repair device 10 coupled thereto. Drive coupling 8 includes a rigid half 12 and a flexible half 14 interconnected by a plurality of threaded fasteners 16. Rigid half 12 includes a generally cylindrical body 18 having a flange 20 radially extending therefrom. Flange 20 includes a plurality of apertures 22 for receipt of threaded fasteners 16. A bore 24 extends axially through body 18. Bore 24 is sized for receipt of a first shaft 26. First shaft 26 is positioned within bore 24 and drivingly coupled to rigid half 12 via a drive key or other standard shaft fastening device, not shown. A recess 28 extends inwardly from a mounting face 30 of flange 20. Recess 28 is in communication with bore 24.

Flexible half 14 includes a shell 32 and hub 34. Hub 34 is drivingly interconnected to shell 32 such that torque provided from first shaft 26 is transferred to a second shaft 36. Torque is transferred from first shaft 26 through rigid half 12 to shell 32 of flexible half 14. The torsional load path continues to flow from shell 32 to hub 34. However, hub 34 is free to axially translate and pivot a predetermined amount relative to shell 32. Accordingly, a misalignment between first shaft 26 and a second shaft 36 is accommodated. Second shaft 36 is drivingly coupled to hub 34 via a key or other fastener not shown.

Shell 32 includes a substantially cylindrical hollow body 38 having an outer surface 39 and a flange 40 radially extending therefrom. Flange 40 includes a mounting face 42 in engagement with mounting face 30 of rigid half 12. A plurality of apertures 44 extend through flange 40. Apertures 44 are aligned with apertures 22 and are in receipt of threaded fasteners 16. A lip 46 inwardly extends from body 38 and includes an end face 48. A plurality of circumferentially spaced protrusions or gears 50 extend inwardly from body 38. An annular groove 52 is positioned between lip 46 and gears 50. A seal 54 is positioned within groove 52 between hub 34 and shell 32. Seal 54 is preferably constructed from a compressible elastomeric material. Shell 32 also includes a counter bore 56 inwardly extending from mounting face 42. A portion of counter bore 56 is similarly sized and aligned with recess 28 of rigid half 12.

Hub 34 includes a substantially cylindrical body 58 having a first end face 60, a second end face 62 and a bore 64 axially extending from first end face 60 to second end face 62. When assembled within shell 32, first end face 60 is axially offset from end face 48 of shell 32. A plurality of protrusions or gears 66 extend radially outwardly from an external surface 67 of body 58. Gears 66 of hub 34 engage gears 50 of shell 32 to form a plurality of interfaces where torsional energy may be transferred. One skilled in the art will appreciate that gears 66 are free to axially translate relative to shell 32 a distance defined by the clearance between second end face 62 of hub 34 and a land 68 of recess 28. Furthermore, a radial clearance exists between protrusions 66 and protrusions 50 such that hub 34 may rotate about an axis transverse to a longitudinal axis 69 of second shaft 36. Accordingly, misalignment between longitudinal axis 69 of second shaft 36 and a longitudinal axis 71 of first shaft 26 is tolerated.

When gears 66 of hub 34 are no longer capable of transmitting torque to gears 50 of shell 32, a need for repair device 10 arises. Repair device 10 includes a first member 70 fixed to shell 32 and a second member 72 fixed to hub 34. First member 70 is drivingly coupled to second member 72 to provide a torque transfer path from shell 32 to hub 34. The first and second members are interconnected to allow hub 34 to axially translate and/or pivot relative to shell 32 as initially designed. Because repair device 10 provides a flexible drive interconnection, the repair to flexible drive coupling 8 has a service life greater than previously known repairs. Additionally, first member 70 and second member 72 are coupled to flexible drive coupling 8 without dismantling the drive coupling or any adjacent components. Therefore, repair device 10 may be installed in a very short period of time.

FIGS. 1 and 2 depict a single first member 70 and a single second member 72 interconnected with one another to form repair device 10. In practice, multiple first members 70 and second members 72 may be circumferentially spaced about flexible drive coupling 8 in meshed pairs as shown in FIGS. 3, 4 and 7–9. The use of multiple meshed pairs assures a desired torque capacity is met. Depending on the size of the flexible coupling, virtually any number of meshed pairs may be used. However, it has been found to be advantageous to use four meshed pairs on a flexible drive coupling having a shell outer diameter under 8 inches. Six meshed pairs equally spaced from one another have been found to perform well on driving couplings having a shell outer diameter ranging from 8 to 19 inches. Eight meshed pairs of first and second members have been found useful to transfer torque on a flexible coupling having a shell outer diameter of 20 to 28 inches. Twelve meshed pairs may be used for shells having an outer diameter of 29 inches or more. It should also be appreciated that the arc length spanned by each first member 70 and the width of each second member 72 may be varied according to the torque transfer requirements and the number of meshed pairs being used on any given flexible drive coupling.

FIGS. 5 and 6 depict first member 70 in greater detail. First member 70 is shaped as a section of a cylindrical tube. First member 70 includes an inner arcuate wall 74 and an outer arcuate wall 76 extending from a first side wall 78 to a second side wall 80. Arcuate wall 74 is shaped to complement the shape of outer surface 39 of shell 32. Outer arcuate wall 76 extends substantially parallel to inner arcuate wall 74. While the wall 74 is demonstrated as being arcuate, as shall be appreciated by those skilled in the art, the wall may have other configurations. First member 70 includes a first end face 82 and a second end face 84. A slot 86 extends in a direction substantially parallel to axis 71, inwardly from second end face 84 and terminates at a curved wall 88 to define a bifurcated end 89. A curved shape is used to minimize stress concentrations formed at the base of slot 86. Slot 86 includes substantially parallel walls 90 spaced apart from one another a predetermined distance 92. Distance 92 is defined to be slightly larger than a width 94 (FIG. 3) of second member 72. Accordingly, second member 72 is free to move axially relative to first member 70 but is restrained from relative rotational movement.

Second member 72 is an elongated member having a substantially rectangular cross-section. Second member 72 includes a mounting face 96 fixed to first end face 60 of hub 34. Second member 72 further includes a pair of substantially parallel and spaced apart side walls 98. Side walls 98 are spaced apart a distance less than distance 92 to provide the slip-fit previously described.

A first end 100 of second member 72 radially extends beyond outer surface 39 of shell 32 in a direction substantially perpendicular to axis 69 and is positioned within slot 86. Second member 72 includes a second end 102 opposite first end 100. Second end 102 may be positioned in contact with second shaft 36 or may be spaced apart therefrom. However, it should be appreciate that second member 72 is preferably not welded to the second shaft 36 to preserve its integrity. It is contemplated that when a replacement flexible drive coupling arrives at the manufacturing location, temporary repair device 10 and the original failed coupling are removed from the driving and driven devices without damage to first shaft 26 and second shaft 36. Therefore, additional repair to the driving and driven components is easily avoided.

FIGS. 10–14 depict an alternate embodiment repair device 200 for use with a shrouded coupling 202. Shrouded coupling 202 is substantially similar to flexible drive coupling 8 previously introduced. Accordingly, like elements will retain their previously introduced reference numerals. Shrouded coupling 202 includes a shell 204 having a substantially cylindrical body 206. Body 206 is hollow and has a wall section substantially thicker than the wall section of body 38. The increased wall section is internally stepped to shield the gear interface of shell 204 to a stepped hub 208. The thicker wall section of shell 204 results in body 206 having an end face 210 of increased size. Based on the increased size of end face 210, a first member 212 of repair device 200 is constructed to include an "L" shaped section.

First member 212 includes a first leg 214 and a second leg 216 substantially orthogonally intersecting one another. First leg 214 includes an inner arcuate surface 218 and an outer arcuate surface 220. Second leg 216 includes a offset inner arcuate surface 222. A slot 224 extends through first leg 214 and second leg 216. Slot 224 includes first and second side walls 226 selectively engageable with a second member 228. As previously described, second member 228 is sized to slip-fit within slot 224 of first member 212. Second leg 216 includes a stop face 230 in engagement with end face 210. It should be appreciated that second leg 216 radially inwardly extends across end face 210 but does not contact hub 208 of shrouded coupling 202.

To assemble repair device 200 to shrouded coupling 202, first member 212 is mounted to shell 204. Preferably, first member 212 is welded to shell 204. A portion of second member 228 is positioned within slot 224. Second member 228 is mounted on an end face 232 of hub 208. Preferably, second member 228 is welded to hub 208. Therefore, repair device 200 allows power to be transferred between shell 204 and hub 208 while shell 204 rotates about an axis not aligned with the rotational axis of hub 208.

Figure 10:
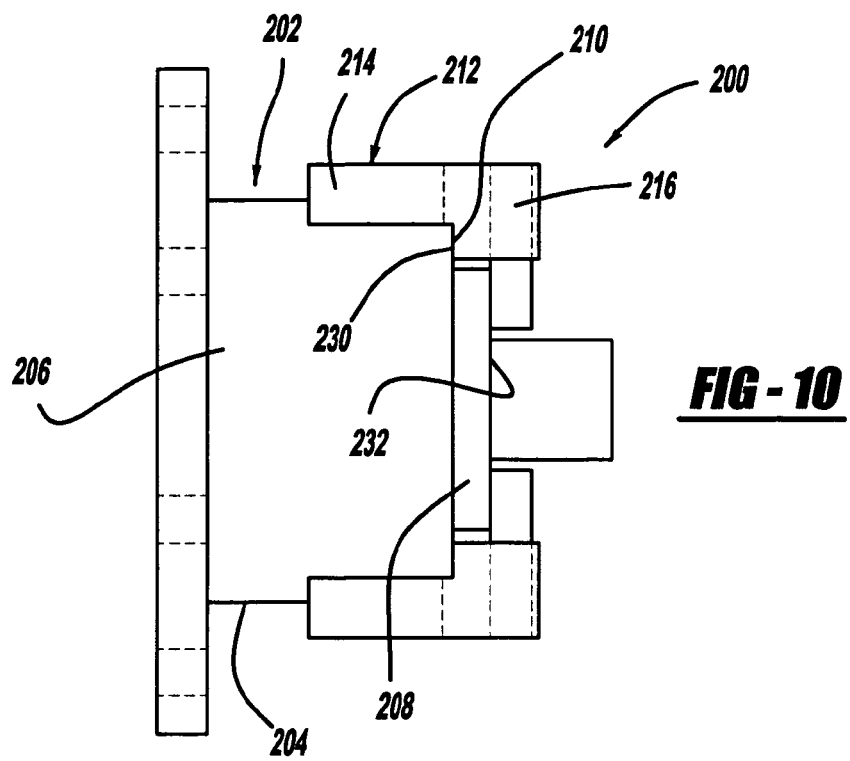
FIG. 10 is a side view of an alternate embodiment temporary repair device shown coupled to a shrouded flexible drive coupling.
Figure 11:
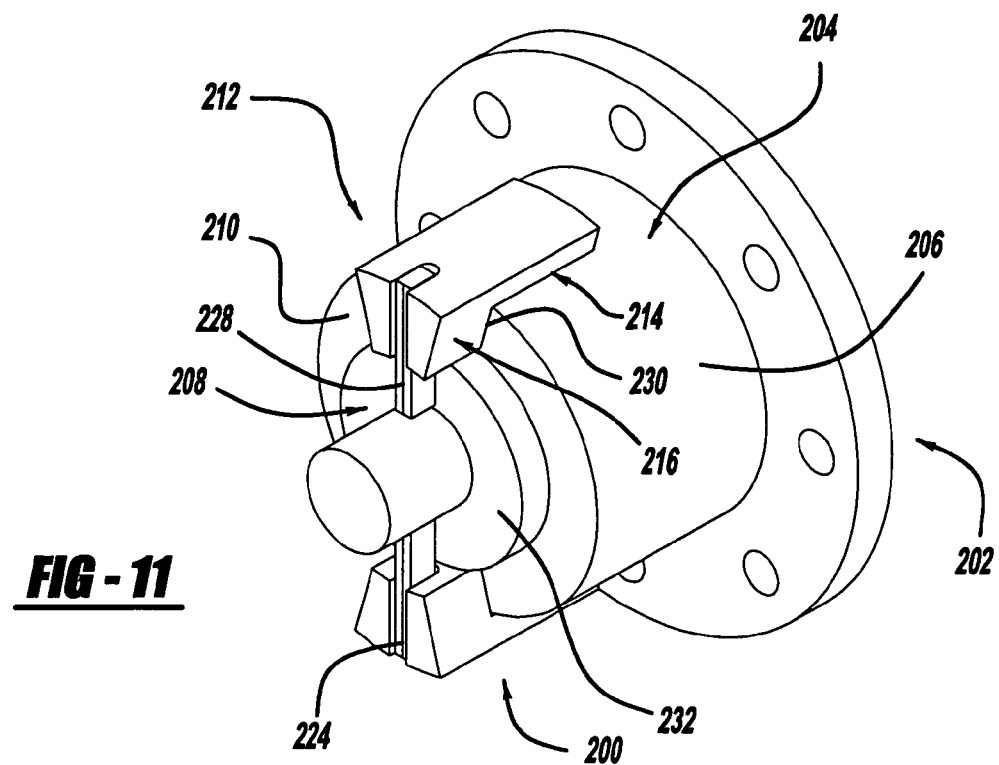
FIG. 11 is a perspective view of the temporary repair device and shrouded coupling of FIG. 10.
Figure 12:
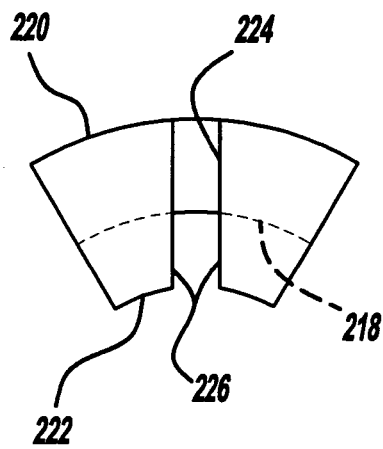
FIG. 12 is a top view of a first member of the alternate embodiment temporary repair device of FIG. 10.
Figure 13:
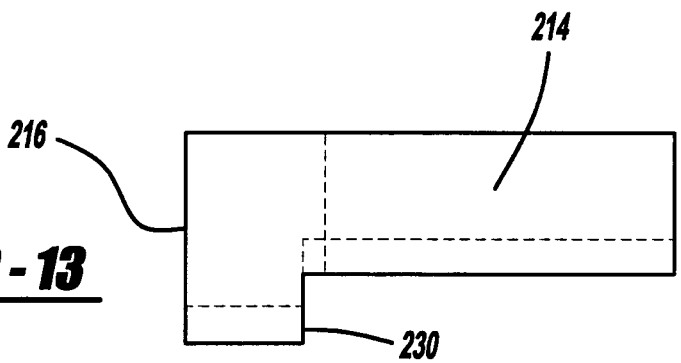
FIG. 13 is a side view of the first member of the alternate embodiment repair device.
Figure 14:
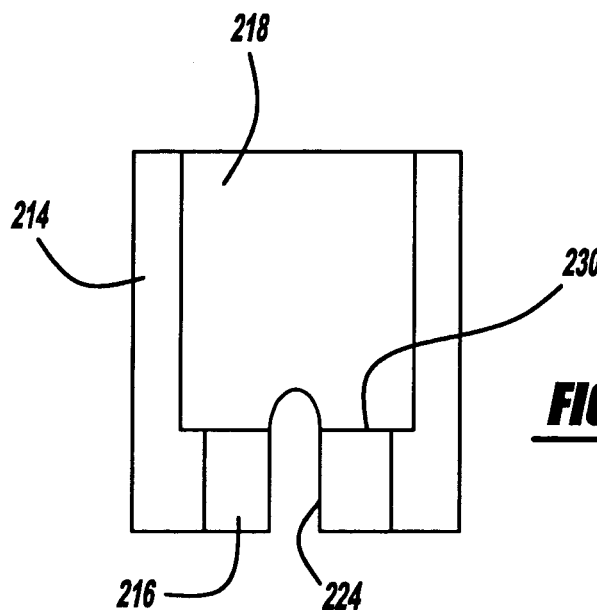
FIG. 14 is a front view of the first member of the alternate embodiment temporary repair device of FIGS. 10 and 11.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims. For example, FIGS. 10 and 11 show two meshed pairs of first and second members. However, virtually any number of meshed pairs may define the repair device.

What is claimed is:

1. In a repair device for a flexible drive coupling of the type initially operable to transmit torque between a shell and a hub along a first torque path, said shell and hub coupled with a respective shaft, the respective shafts defining first and second axes and said shell and hub enabling annular misalignment of said first and second axes, the repair device in combination with the flexible drive coupling, wherein the improvement comprises:
 a first member coupled to the shell, the first member including a slot; and
 a second member coupled to the hub, a portion of said second member extending from the hub, said portion being slidably positioned within said slot, said first member being drivingly engageable with said second member to transfer torque between the shell and the hub along a second torque path.

2. The repair device of claim 1 wherein the second torque path is operable to substitute for the first torque path if the first torque path becomes inoperable.

3. The repair device of claim 2 wherein said first member includes a bifurcated end in receipt of said portion of said second member.

4. The repair device of claim 3 wherein said first member includes an arcuate inner wall adapted to engage an outer surface of the shell.

5. The repair device of claim 4 wherein said first member is adapted to axially overhang the shell.

6. The repair device of claim 1 further including third and fourth members, said third member being substantially similar to said first member and being circumferentially spaced apart therefrom and fixed to the shell, said fourth member being substantially similar to said second member and being circumferentially spaced apart therefrom and fixed to the hub, said third member slidably engaging a slot of said fourth member.

7. In combination with a repair device of the type wherein a flexible drive coupling drivingly interconnects a first rotatable shaft and a second rotatable shaft along a first torque path, the flexible coupling includes a shell being rotatable about a first axis and coupled to the first rotatable shaft and a hub being rotatable about a second axis and coupled to the second rotatable shaft, said shell and hub have meshing teeth which enable angular misalignment between first and second axes, wherein the improvement comprises:
 a first member adapted to axially overhang the shell and be fixed thereto, the first member including a slot; and
 a second member adapted to radially overhang the hub and be fixed thereto, a portion of the second member being slidably positioned within the slot, the first member being drivingly engageable with the second member wherein the repair device is adapted to transfer torque between the shell and the hub along a second torque path and drivingly interconnect the first and second rotatable shafts.

8. The combination of claim 7 wherein the second torque path is operable when the first torque path is at least partially inoperable.

9. The combination of claim 8 wherein the first member includes a bifurcated end in receipt of the portion of the second member.

10. The combination of claim 9 wherein the first member includes an arcuate inner wall adapted to engage an outer surface of the shell.

11. The combination of claim 7 further including third and fourth members, said third member being substantially similar to said first member and being circumferentially spaced apart therefrom and fixed to the shell, said fourth member being substantially similar to said second member and being circumferentially spaced apart therefrom and fixed to the hub, said third member slidably engaging a slot of said fourth member.

12. The combination of claim 7 wherein the second axis is not aligned with the first axis.

13. In combination with a repair device of the type wherein a flexible drive coupling drivingly interconnects a first rotatable shaft and a second rotatable shaft along a first torque path, the flexible coupling includes a shell being rotatable about a first axis and coupled to the first rotatable shaft and a hub being rotatable about a second axis and coupled to the second rotatable shaft, said shell and hub enabling angular misalignment of the first and second axes, wherein the improvement comprises:

a first member individually covering a sector portion, substantially less than 360°, of a circumference of the shell, said first member adapted to axially overhang the shell and be fixed thereto, the first member including a slot; and a second member individually affixed to a portion of the hub, said second member adapted to radially overhang the hub, a portion of the second member being slidably positioned within the slot, the first member being drivingly engageable with the second member wherein the repair device is adapted to transfer torque between the shell and the hub along a second torque path and drivingly interconnect the first and second rotatable shafts.

* * * * *

UNITED STATES PATENT AND TRADEMARK OFFICE
CERTIFICATE OF CORRECTION

| | | |
|---|---|---|
| PATENT NO. | : 7,097,566 B2 | Page 1 of 1 |
| APPLICATION NO. | : 11/120868 | |
| DATED | : August 29, 2006 | |
| INVENTOR(S) | : Phillip E. Neff | |

It is certified that error appears in the above-identified patent and that said Letters Patent is hereby corrected as shown below:

Title Page #75
Item (75) Inventor., delete "Philip" and insert --Phillip--.

Signed and Sealed this

Twenty-eighth Day of November, 2006

JON W. DUDAS
*Director of the United States Patent and Trademark Office*